United States Patent [19]
Yamanaka

[11] Patent Number: 4,731,652
[45] Date of Patent: Mar. 15, 1988

[54] SHADING CORRECTION SIGNAL GENERATING DEVICE FOR A TELEVISION CAMERA APPARATUS

[75] Inventor: Junichi Yamanaka, Sagamihara, Japan

[73] Assignee: Kabushiki Kaisha Toshiba, Kawasaki, Japan

[21] Appl. No.: 29,953

[22] Filed: Mar. 25, 1987

[30] Foreign Application Priority Data

Mar. 25, 1986 [JP] Japan .................................. 61-66283

[51] Int. Cl.⁴ ............................................. H04N 5/14
[52] U.S. Cl. ................................. 358/163; 358/213.27
[58] Field of Search ...................... 358/163, 37, 213.27, 358/284, 166

[56] References Cited

U.S. PATENT DOCUMENTS 3,919,473 11/1975 Cotter .................................. 358/163
4,618,892 10/1986 Kawaguchi .......................... 358/163

FOREIGN PATENT DOCUMENTS 0046621 4/1980 Japan .................................... 358/163
0066178 5/1980 Japan .................................... 358/163
58-54784 3/1983 Japan .

Primary Examiner—James J. Groody
Assistant Examiner—Michael D. Parker
Attorney, Agent, or Firm—Oblon, Fisher, Spivak, McClelland & Maier

[57] ABSTRACT

A shading correction wave generating unit generates a predetermined shading correction waveform signal including AC signal components on the basis of a scanning drive signal with at least one of horizontal or vertical scanning frequencies for a TV screen. An area-designating signal generating unit generates an area-designating signal to designate a specific area on the TV screen on the basis of said scanning drive signal. A potential clamping unit receives the predetermined shading correction waveform signal including AC signal components and the area-designating signal, and clamps the predetermined shading correction waveform including AC components to a specific potential in the specific area designated by the area-designating signal. An output unit produces a shading correction signal which is the predetermined shading correction waveform signal including AC components as clamped to the specific potential in the specific area by the potential clamping unit.

11 Claims, 5 Drawing Figures

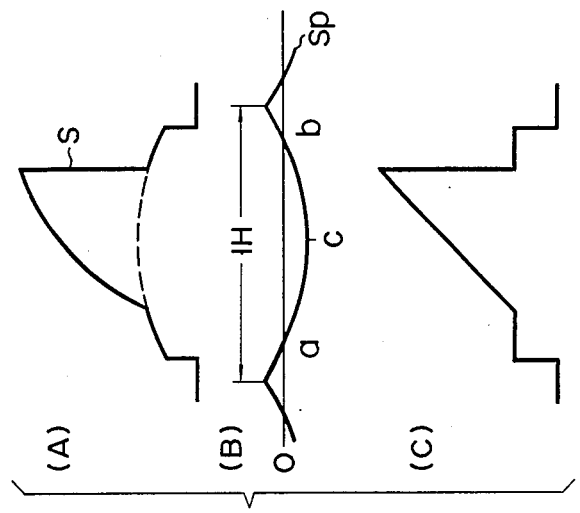
FIG. 4 (PRIOR ART)
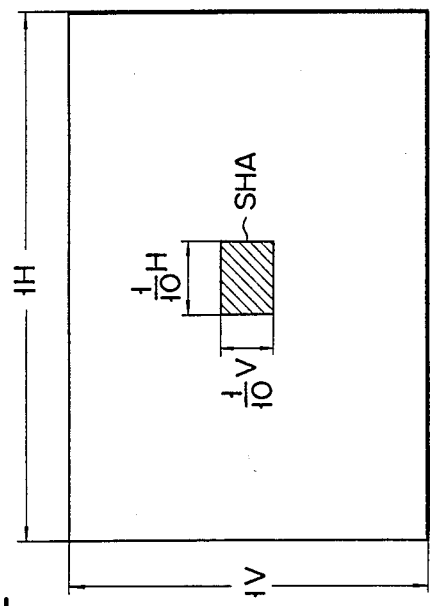
FIG. 2
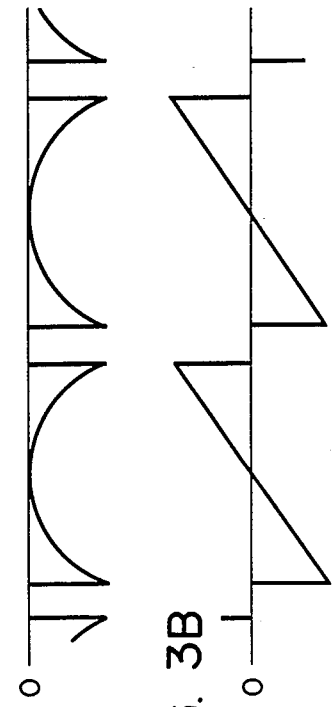
FIG. 3A
FIG. 3B

SHADING CORRECTION SIGNAL GENERATING DEVICE FOR A TELEVISION CAMERA APPARATUS

BACKGROUND OF THE INVENTION

This invention relates to a shading correction signal generating device for a television camera apparatus. More particularly, the invention relates to a shading correction signal generating device which is suitable in use for a system in which various types of shadings superposed on picture signals derived from a picture pick-up device are corrected in an analog manner, and the shading correction does not significantly influence the level adjustment at a succeeding stage.

As is well known, the shadings occurring in the picture signals from TV cameras are generally classified into two types. The shading of the first type additively occurs in the picture signals from the image pick-up device. This shading is the pedestal shading due to varied dark current of the pick-up device and varied bias light. The second type of shading occurs in the picture signals in a multiplying manner. This shading makes the black level nonuniform on the entire screen. The shading is called a modulation shading, which arises from, for example, a sensitivity variation due to beam landing error of the image pick-up device, a variation of incident light amount in the optical system, including lenses, and a light-separation optical system, and nonuniform sensitivities of indiviudal picture elements of the solid state image pick-up device. The modulation shading results in an output decrease in the peripheral portion of the screen.

Both types of shadings may be mixed with the true picture signals of a photographed image in the additive and multiplying manner. For the correction of these shadings, waveform correction signals of vertical and horizontal scanning components, usually combined sawtooth and parabolic waveforms, are applied to the picture signals from the image pick-up device in the additive and multiplying manner of analog, to cancel out the shadings.

It is a common practice that, for each correction signal as the base in the correcting process, its AC component along is superposed for correction. The usual way to pick up the AC component is to cut off the DC component contained in each correction signal by a coupling capacitor, for example.

Thus, only the AC component is used for the shading correction. In the correction, the flyback period or blanking period of the vertical and/or horizontal shading waveform must be zero. To this end, the correction waveform is chopped during the blanking period by means of a chopper means. The reason for this is that the blanking period of the vertical and/or horizontal scannings contains the period for providing the pure black level, and this period must be kept intact.

FIG. 4B shows a parabolic waveform, which has been conventionally used, for correcting the superposed shading over one horizontal period 1H. The parabolic waveform is superposed on a picture signal S of FIG. 4A, to obtain a corrected waveform, as shown in FIG. 4C. As seen, the correction signal waveform Sp contains only two points, "a" and "b", where the instantaneous value is zero. For example, the correction waveform has a negative instantaneous value at point "c" which is located at the center of the horizontal period. If such a correction waveform is superposed on the picture signal S of FIG. 4A, the pedestal level in the center area of the screen changes horizontally on the screen. This is correspondingly applied for one vertical period 1V. Further, the same thing is true for the correction for the modulation shading.

Normally, the level adjustment of the picture signals is made for the center area of the TV screen for both vertical and horizontal. Therefore, it is inevitable that the center area level, particularly the pedestal level, changes. A level adjustment for the correction of this pedestal level change has been made in a proper succeeding stage.

SUMMARY OF THE INVENTION

It is, therefore, an object of this invention to provide a new and improved shading correction signal generating device for a television camera apparatus, which generates a correction signal for shading correction by which the level adjustment in a succeeding stage is not significantly influenced.

According to the present invention, there is provided a shading correction signal generating device for a TV camera apparatus, said device comprising:

shading correction wave generating means for generating a predetermined shading correction waveform signal including AC signal components on the basis of a scanning drive signal with at least one of horizontal or vertical scanning frequencies for a TV screen;

area-designating signal generating means for generating an area-designating signal to designate a specific area in the TV screen on the basis of the scanning drive signal;

potential clamping means for receiving the predetermined shading correction waveform signal including AC signal components and the area-designating signal, and for clamping the predetermined shading correction waveform including AC components to a specific potential in the specific area designated by the area designating signal; and output means for producing a shading correction signal which is the predetermined shading correction waveform signal including AC components as clamped to the specific potential in the specific area by the potential clamping means.

BRIEF DESCRIPTION OF THE DRAWINGS

These and other objects and features of the present invention can be understood through the following preferred embodiment by reference to the accompanying drawings, in which:

FIG. 2 shows a specific TV screen useful in explaining the operation of this embodiment;

FIGS. 3A and 3B show waveforms for explaining the operation of the embodiment; and FIG. 4 shows a set of waveforms for explaining a conventional shading correction.

DETAILED DESCRIPTION OF THE PREFERRED EMBODIMENT

Figure 1:
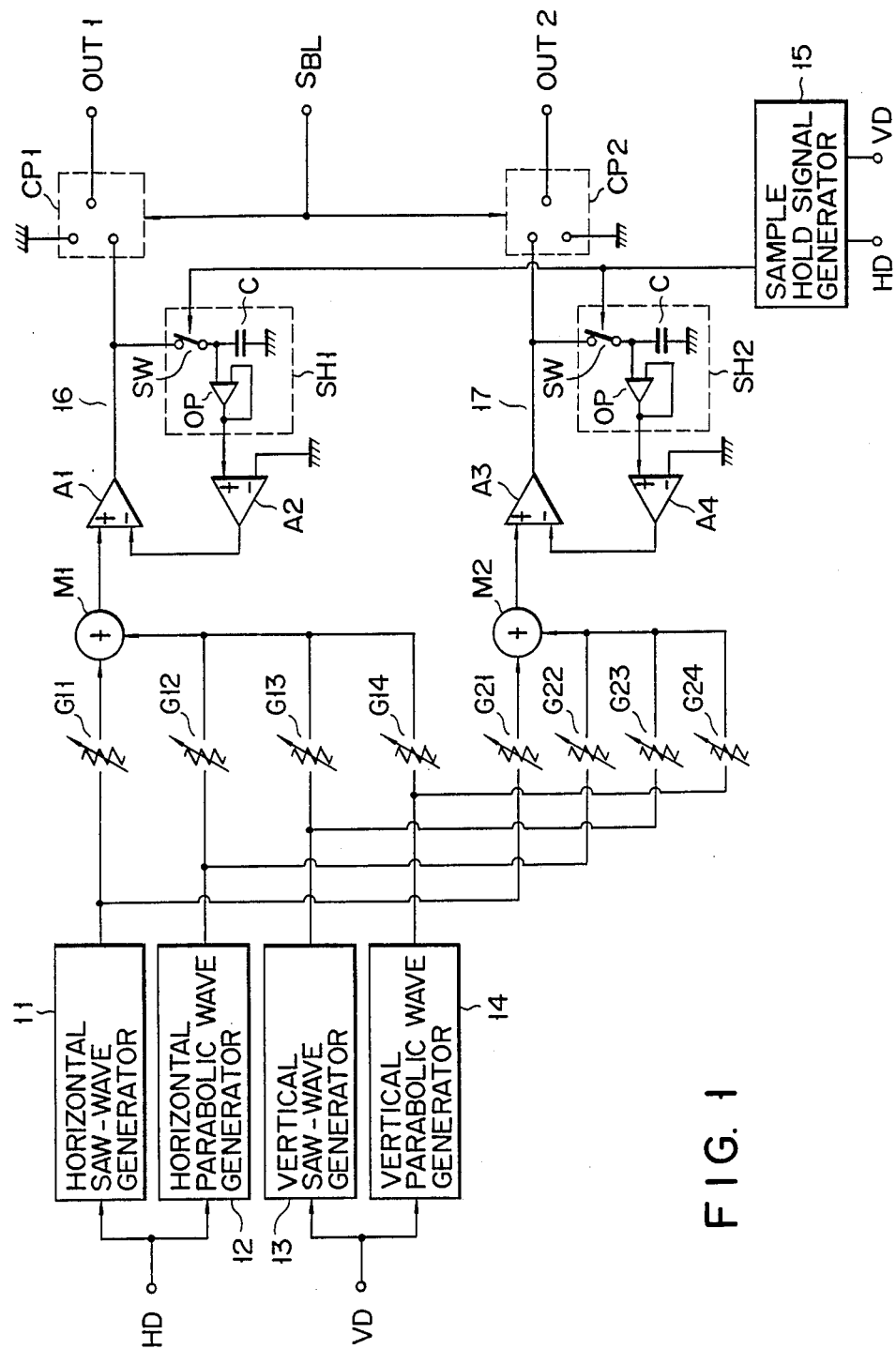
FIG. 1 is a circuit diagram of an embodiment of a shading correction signal generating device according to this invention.

An embodiment of the present invention will now be described, with reference to the accompanying drawings.

Reference numeral 11 designates a horizontal sawtooth wave generator. Numeral 12 designates a horizontal parabolic wave generator. 13 designates a vertical saw-tooth wave generator. 14 designates a vertical parabolic wave generator. A sync signal generator (not shown) generates horizontal and vertical drive signals HD and VD, which are necessary for the scanning of a television camera apparatus (not shown). Using signal HD, horizontal saw-tooth wave generator 11 and horizontal parabolic wave generator 12 generate predetermined shading correction signals of saw-tooth and parabolic waves, which contain AC signal components. Similarly, using signal VC, vertical saw-tooth wave generator 13 and vertical parabolic wave generator 14 generate predetermined shading correction signals of saw-tooth and parabolic waveforms, which contain AC signal components. On the basis of correction waveforms, gain control circuits G11 to G14 make gain control, and obtain superposing shading correction waveforms. Gain control circuits G11 to G14 comprise variable resistors and differential gain controls circuits. Gain control circuits G11 to G14 are controlled so that the waveforms to correct the shading components of a picture signal from an image pickup device (not shown) are formed in a shading correction circuit (not shown), as described later. The outputs of control circuits G11 to G14 are mixed by adder M1. The mixed signal is supplied to operational amplifier A1. The output of operational amplifier A1 is sampled and held by a known sample/hold circuit SH1 made up of switch SW, capacitor C and operational amplifier OP. The sample/hold is performed in the center area such as area SHA (1H/10, 1V/10), on the TV screen, as shown in FIG. 2. The sample/hold pulse signal used for this sample/hold, may be generated by sample/hold signal generator 15, by using horizontal and vertical drive signals HD and VD. The output of sample/hold circuit SH1 is compared with ground potential (reference potential) by operational amplifier A2. Operational amplifiers A1 and A2 and sample/hold circuit SH1 make up clamp circuit 16. Clamp circuit 16 feeds back the output of operational amplifier A1 by operational amplifier A2, so that the output of sample/hold circuit SH1 will have the same potential as the reference potential. Therefore, if sample/hold circuit SH1 is so constructed that the input and output of sample/hold circuit SH1 will have the same potential, then the output signal of operational amplifier A1 corresponding to the area SHA of the TV screen will have the same potential as the reference potential.

The output of operational amplifier A1 is supplied to a first input terminal of switch CP1. A second input terminal of switch CP1 is held at ground potential (reference potential). The switching between the first and second input terminals is made in response to blanking pulse SBL. By the switching, ground potential is output during the blanking period. The output of switch CP1 is produced from terminal OUT 1, with a saw(—tooth) or parabolic waveform or these mixed waveform, as illustrated in FIGS. 3 A and B. That output signal is supplied to shading correction circuit (not shown), as a superposing shading correction signal. Therefore, the signal during the blanking period and the area SHA signal are placed at reference potential. Thus, since the instantaneous value of the shading waveform in the screen center area is equal to the signal level during the blanking period, the pedestal level in this area after correction is invariable even if any waveform is used for the correction.

Similarly, in FIG. 1, the outputs of horizontal saw-tooth wave generator 11 and horizontal parabolic wave generator 12, and vertical saw wave generator 13 and vertical parabolic wave generator 14 are supplied via gain control circuit G21 to G24 and adder M2, to operational amplifier A3. Gain control circuits G21 and G24 are for obtaining a modulation shading correction waveform. The output of operational amplifier A3 is sampled and held by sample/hold circuit SH2, as by sample/hold circuit SH1. The output of sample/hold circuit SH2 is compared with ground potential (reference potential) by operational amplifier A4. The output of operational amplifier A4 is supplied to operational amplifier A3. Operational amplifiers A3 and A4 and smaple/hold circuit SH2 make up clamp circuit 17. This clamp circuit 17 is operated in the same manner as clamp circuit 16 made up of operational amplifiers A1 and A2 and sample/hold circuit SH1.

The output of operational amplifier A3 is supplied to switch CP2. In the same manner as that described for the CP1, the switching between the output of amplifier A3 and ground potential (reference potential) is performed in response to blanking pulse SBL.

Therefore, at terminal OUT2 of switch CP2, the center area signal and the blanking period signal are both held at ground potential. The output signal from terminal OUT2 is supplied to shading correction circuit (not shown), as a modulation shading correction signal.

In this modulation shading correction also, the picture signal level is invariable, even if any waveform of the center area signal is used.

In the case of the superposing shading correction, it is also possible to control the pedestal level by causing a difference between the reference potential of operational amplifier A2 and the reference potential of sample/hold circuit SH1. In this case, a fixed offset appears in the center area signal due to that difference, allowing control of the pedestal level. Also in the case of modulation shading correction, a similar operation, if applied, allows the picture signal gain to be controlled.

As seen from the foregoing, the signal level in the center area of the screen can be kept at a fixed value for any waveform of correction signal, in both shading corrections of superposing and modulation.

As described above, the shading correction signal generating device of the this invention can produce a shading correction signal waveform, which makes the picture signal level and the pedestal level invariable in the usual adjustment of these levels, when the shading correction signal waveform is changed or the correcting operation is turned on and off. This feature eliminates the readjustment of the pedestal level for every shading correction and the readjustment of the picture signal level for every modulation shading correction.

While the fixed potential is kept in the center area of the TV screen in the above-mentioned embodiment, it is evident that it may be performed any other area of the screen.

What is claimed is:

1. A shading correction signal generating device for a television camera apparatus, said device comprising:
    shading correction wave generating means for generating a predetermined shading correction waveform signal including AC signal components on the basis of a scanning drive signal with at least one of horizontal or vertical scanning frequencies for a TV screen;

area-designating signal generating means for generating an area-designating signal to designate a specific area on the TV screen on the basis of said scanning drive signal;

potential clamping means for receiving said predetermined shading correction waveform signal including AC signal components and said area-designating signal, and for clamping said predetermined shading correction waveform including AC components to a specific potential in said specific area designated by said area-designating signal; and output means for producing a shading correction signal which is said predetermined shading correction waveform signal including AC components as clamped to the specific potential in the specific area by said potential clamping means.

2. A shading correction signal generating device according to claim 1, wherein said specific area is located approximately at the center area on the television screen.

3. A shading correction signal generating device according to claim 2, wherein said predetermined potential is the reference potential.

4. A shading correction signal generating device according to claim 1, wherein said output means includes means for outputting said shading correction signal as said reference potential, during a blanking period.

5. A shading correction signal generating device according to claim 1, wherein said potential clamping means includes a first operational amplifier for receiving said predetermined shading correction waveform, outputting said shading correction signal, a sample/hold circuit for sampling and holding the output of said first operational amplifier by said area designating signal, and a second operational amplifier for comparing the output of said sample/hold circuit with reference potential, and for feeding back the result of the comparison to said first operational amplifier.

6. A shading correction signal generating device according to claim 1, wherein said shading correction waveform is a waveform for superposing shading correction.

7. A shading correction signal generating device according to claim 1, wherein said shading correction waveform is a waveform for modulation shading correction.

8. A shading correction signal generating device according to claim 1, wherein said shading correction waveform includes the waveforms for superposing shading correction and for modulation shading correction.

9. A shading correction signal generating device according to claim 1, wherein said shading correction waveform includes a saw-tooth waveform.

10. A shading correction signal generating device according to claim 1, wherein said shading correction waveform includes a parabolic waveform.

11. A shading correction signal generating device according to claim 1, wherein said shading correction waveform generating means includes means for mixing a saw-tooth waveform and a parabolic waveform at a predetermined mixing ratio.

* * * * *